(12) United States Patent
Colussi et al.

(10) Patent No.: US 7,808,340 B2
(45) Date of Patent: Oct. 5, 2010

(54) PLUG-IN DEVICE FOR SIGNAL CORRECTION

(75) Inventors: Joseph M. Colussi, Chalfont, PA (US); Ralph E. Alexander, Philadelphia, PA (US); Jospeh Hill, Jr., Warminster, PA (US); Christopher E. Jeblonski, Hatboro, PA (US); Walter R. Sharp, Ocean Pines, MD (US)

(73) Assignee: General Instrument Corporation, Horsham, PA (US)

( * ) Notice: Subject to any disclaimer, the term of this patent is extended or adjusted under 35 U.S.C. 154(b) by 229 days.

(21) Appl. No.: 12/039,832

(22) Filed: Feb. 29, 2008

(65) Prior Publication Data

US 2009/0219117 A1  Sep. 3, 2009

(51) Int. Cl.
*H04B 3/04* (2006.01)
*H03H 7/24* (2006.01)

(52) U.S. Cl. .................... 333/28 R; 333/81 R

(58) Field of Classification Search ............... 333/28 R, 333/81 R
See application file for complete search history.

(56) References Cited

U.S. PATENT DOCUMENTS

| 3,854,659 | A * | 12/1974 | Bucherl et al. | 333/28 R |
| 5,990,929 | A * | 11/1999 | Sandaluk | 725/127 |
| 6,107,896 | A * | 8/2000 | Elco et al. | 333/28 R |
| 6,646,519 | B2 * | 11/2003 | Sperber | 333/28 R |
| 7,330,086 | B2 * | 2/2008 | Martine | 333/81 R |

* cited by examiner

*Primary Examiner*—Stephen E Jones
(74) *Attorney, Agent, or Firm*—Larry T. Cullen

(57) ABSTRACT

Described herein are systems and methods for a JXP-type plug-in device that may be inserted within existing transmission equipment, such as RF amplifiers and the like, to provide an appropriate amount of flat attenuation to the lower frequencies of signals being processed in the equipment while allowing desired peaking at high frequencies of the same signals to compensate for high-frequency roll-off.

13 Claims, 2 Drawing Sheets

PLUG-IN DEVICE FOR SIGNAL CORRECTION

BACKGROUND

Plug-in devices such as plug-in attenuators and equalizers are used in cable television (CATV) and other communications systems to correct or modify signals as they are transmitted throughout the systems over long lengths of cable. Conventionally, signal correction or modification is performed to maintain a desired signal response, which is typically a signal with a flat or sloped amplitude response over its frequency range, for optimal system processing of signals. For example, plug-in attenuators or the like are inserted in-line with transmission equipment, such as radio frequency (RF) amplifiers and other headend equipment, in a cable plant or head-end facility to attenuate a signal to a desired level. Similarly, plug-in equalizers or the like are inserted in-line with transmission equipment to level a signal throughout its frequency range to compensate for undesired frequency-related attenuation of the signal as it is transmitted over long lengths of cable.

Recent frequency expansion of existing CATV plants has been negatively impacted by excess high frequency roll-off, resulting in lower than optimum signal levels at the high end of the operating frequency range. For example, the excessive high frequency roll-off currently being encountered in 1 GHz cable plant expansions is due to the cascaded roll-off of several active and passive devices in the cable plant, many of which were installed when the cable plant was operating at 870 MHz and below.

SUMMARY

In light of the aforementioned problems, there is a desire to have a plug-in device for signal correction that is capable of compensating for high-frequency roll-off and maintaining the desired system response without unduly attenuating the overall level of signals in transmission. Particularly, there is a desire to compensate for excess high frequency roll-off that is problematic for frequency expansion of CATV plants, without major modifications to the cable plant.

Accordingly, described herein are systems and methods for a plug-in device that may be inserted within existing transmission equipment, such as RF amplifiers and the like, to provide an appropriate amount of flat attenuation (i.e., attenuating a signal to achieve a desired flat signal response) to the lower frequencies of signals being processed in the equipment while allowing desired peaking at high frequencies of the same signals to compensate for high-frequency roll-off. With an assortment of attenuation values, this device is operable to replace standard JXP-type attenuators in a communication system, such as an existing CATV plant and provide the desired amount of flat attenuation to balance the CATV plant, while also providing a resonant peak to achieve the required high frequency roll-off correction.

Accordingly, in one embodiment there is provided a plug-in device connectable to an electrical equipment to modify a signal processed by the electrical equipment. The plug-in device comprises an attenuator circuit operating to provide a substantially flat attenuation of the signals processed by the electrical equipment across the frequency range of the signal and a series resistor-inductor-capacitor (RLC) circuit electrically coupled to the attenuator circuit, the series RLC circuit operable to set a frequency and bandwidth of a resonant peak of the plug-in device and to compensate for the provided substantially flat signal response at the resonant frequency.

In another embodiment there is provided a JXP-type device connectable to transmission equipment to modify signals processed by the electrical equipment. The JXP-type device comprises an attenuator circuit operating to provide a substantially flat attenuation of the signals processed by the transmission equipment across the frequency range of the signals, a high-frequency compensation circuit electrically coupled to the attenuator circuit to set a resonant peak in the JXP-type device and to compensate for the provided substantially flat signal attenuation at the resonant frequency, and a balancing circuit electrically connected to the attenuator circuit to balance the impedance posed by the high-frequency compensation circuit; wherein the nominal impedance of the JXP-type device is substantially the same as the nominal impedance of the electrical equipment, and the JXP-type device is detachable from the electrical equipment and interchangeable with another device also of JXP-type.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
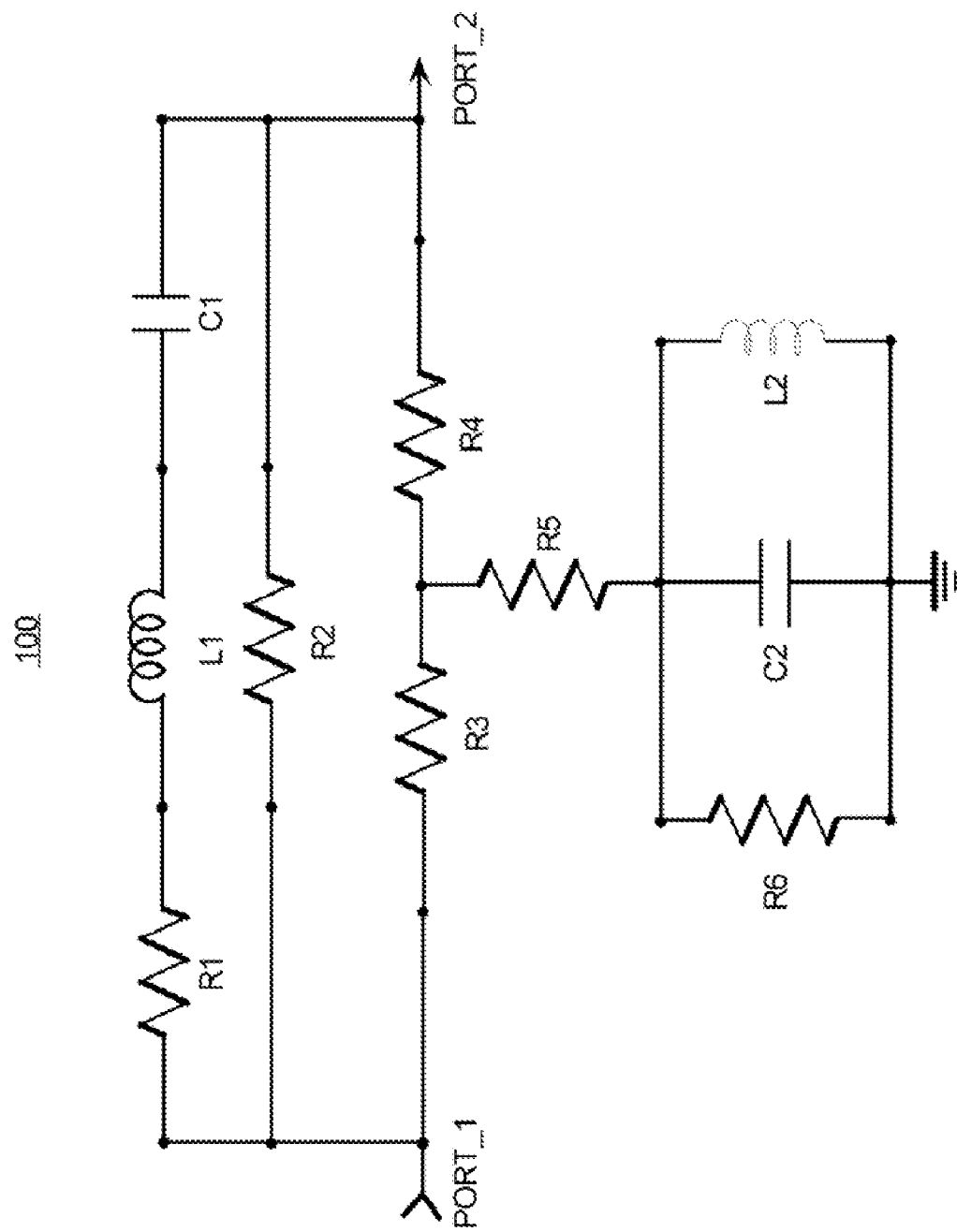
FIG. 1 illustrates a circuit diagram of a plug-in device, in accordance with one embodiment.

FIG. 1 illustrates a circuit diagram 100 of a plug-in device that is operable to be inserted within appropriate transmission equipment, such as an RF amplifier or other electrical equipment of the like. The circuit 100 is designed to provide an appropriate amount of flat attenuation to the lower frequencies of signals being processed in the equipment while allowing desired peaking at high frequencies of the same signals to compensate for high-frequency roll-off. The circuit 100 is also designed such that the resulting plug-in device may be easily inserted into the transmission equipment. For example, the plug-in device may be inserted into a RF amplifier at the same location or in the same signal path that a typical attenuator or equalizer of an industry standard 3-pin configuration, whereby the three (3) pins are arranged in-line (also referred in the industry as a JXP configuration for JXP attenuators and JXP equalizers).

In operation, the circuit 100 receives input signals to be modified, such as RF signals output from an RF amplifier, at its input, Port_1, and outputs the modified signals at its output, Port_2. The circuit 100 includes an attenuator circuit portion that is arranged in a bridged-T configuration. Alternative embodiments are contemplated, wherein the attenuator circuit may be arranged in a standard T or (Pi) configuration. This bridged-T attenuator circuit provides a substantially flat attenuation of the input signals across a frequency range and includes resistive elements, such as resistors R2, R3, R4, and R5. The desired amount of signal attenuation may be adjusted by adjusting the values for R2-R5 in a manner known in the art for a bridged-T configuration.

To compensate for the high-frequency roll-off that typically happens in communications systems as described earlier, a series RLC (resistor-inductor-capacitor) circuit portion is provided in the circuit 100. The series RLC circuit is electrically connected to the bridged-T attenuator circuit portion as illustrated in FIG. 1 and includes a resistive element, such as a resistor, R1, an inductive element, such as an inductor L1, and a capacitive element, such as a capacitor, C1 that are arranged in series. The high frequencies at which there is a desire to increase the signal level to compensate for high-frequency roll-off may be adjusted by adjusting the values of L1 and C1 to adjust the frequency and bandwidth of the resonant peak of the circuit 100. In one example, the resonant frequency of the circuit 100 is set at 1 GHz to accommodate frequency expansion in communication systems such as CATV systems or plants that desire to achieve full 1 GHz bandwidth. At this resonant frequency, which is the desired high frequency for roll-off compensation, L1C1 in series act as a low impedance that enables the input signal to flow through R1 (and L1C1) and be attenuated by R1 instead of the bridged-T attenuator circuit portion R2-R5. Thus, the desired amount of attenuation at high frequency is governed and adjustable by adjusting the value of R1, which is less than the equivalent resistance of the bridged-T configuration so as to direct the input signal to go through R1 for less attenuation. Accordingly, the signal level at the resonant frequency of the circuit 100 is kept higher to compensate for high-frequency roll-off.

To provide impedance matching to the series RLC circuit portion to balance the circuit 100, a parallel RLC circuit portion is added in the circuit 100. The parallel RLC circuit includes a resistive element, such as a resistor, R6, an inductive element, such as an inductor L2, and a capacitive element, such as a capacitor, C2 arranged in parallel with each other. Thus, the values for R6, L2, and C2 are chosen such that the resulting impedance of the circuit 100 substantially matches the impedance of the transmission equipment or system to which it is inserted according to the duality rules. For example, to match the nominal 75-ohm impedance of a CATV plant, the values for the various components in both the series and parallel RLC circuit portions are chosen to balance the circuit 100 and to provide a nominal 75-ohm impedance for the circuit 100. At the resonant frequency of the circuit 100, as set by the values of L1 and C1 in the series RLC circuit, L2 in parallel with C2 (L2||C2) act as a high impedance circuit (relative to R6), leaving R6 in series with R5 of the bridged-T circuit. Thus, the value of R6 is chosen to be sufficiently high to contribute to the high resistance of the bridged-T attenuator circuit portion so as to direct the input signal to R1 as noted above, and maintain the nominal 75-ohm impedance of the device.

Figure 2B:
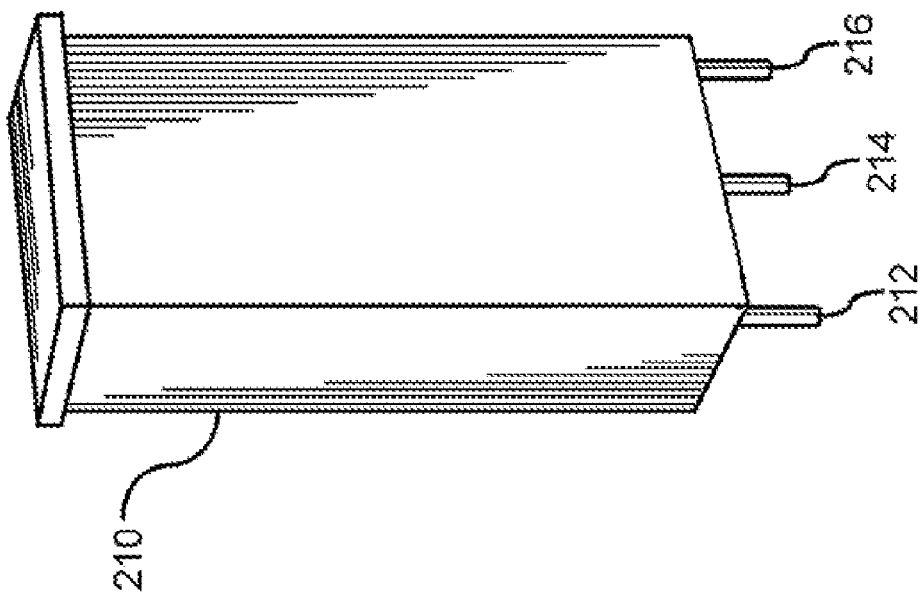
FIGS. 2A-B illustrate an exemplary housing for a plug-in device, in accordance with one embodiment.
Figure 2A:
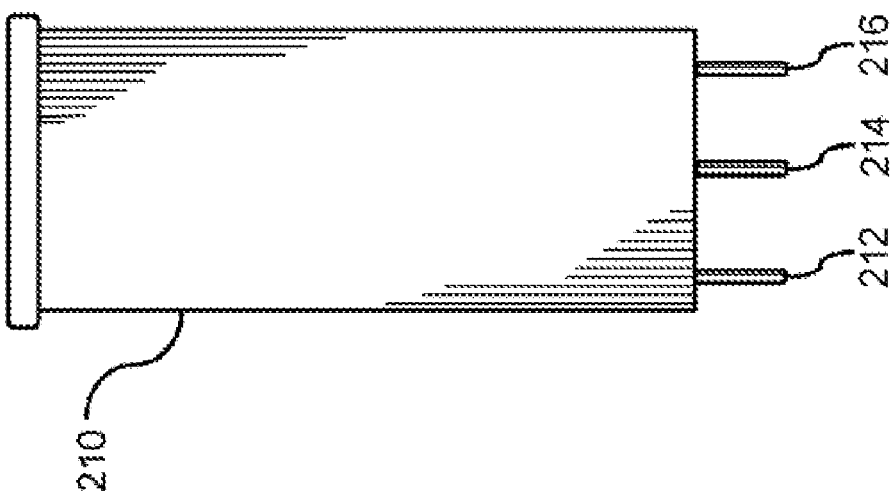

The circuit 100 may have the form factor of a JXP-type device 210 with three protruding pins 212, 214, and 216 for Port_1, GND, and Port_2, respectively, arranged in-line as illustrated in FIGS. 2A-B. Alternative embodiments are contemplated wherein the circuit 100 may be housed or encapsulated in different enclosures for a JXP-type device so long as such an enclosure may be accommodated for connection with a desired communication system via the three pins. For example, U.S. Pat. No. 6,778,035, assigned on its face to General Instrument Corporation and herein incorporated by reference in its entirety, illustrates various possible enclosures for the circuit 100. Thus, the device is connectable to the desired communication system, via the three protruding pins, at the connection points typically used by conventional JXP-type plug-in attenuators or equalizers.

Accordingly, the systems and methods as described herein provide a plug-in device that is able to be inserted within existing transmission equipment to provide a desired flat signal attenuation throughout an entire frequency range of the input signal, except for a selected high-frequency band wherein the desired signal attenuation is less pronounced to compensate for high-frequency roll-off typically found in such transmission equipment.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims, and their equivalents, in which all terms are meant in their broadest reasonable sense unless otherwise indicated.

What is claimed is:

1. A plug-in device connectable to an electrical equipment to modify signals processed by the electrical equipment, the plug-in device comprising:
   an attenuator circuit operating to provide a substantially flat attenuation of the signals processed by the electrical equipment across a frequency range of the signals; and
   a series resistor-inductor-capacitor (RLC) circuit electrically coupled to the attenuator circuit, the series RLC circuit operable to set a frequency and bandwidth of a resonant peak of the plug-in device and to compensate for the provided substantially flat attenuation at the resonant frequency,
   wherein the attenuator circuit is a circuit having one of a bridged-T configuration, a T configuration, and a Pi configuration with resistive elements therein.

2. The plug-in device of claim 1, wherein the impedance of the plug-in device is set to match an impedance of the electrical equipment.

3. The plug-in device of claim 1, wherein the electrical equipment is employed in a cable television system.

4. The plug-in device of claim 1, wherein the plug-in device is a device having three pins arranged in-line, the three pins include a first pin operable to receive the signals processed by the electrical equipment, a second pin operable to be connected to a ground potential in the electrical equipment, and a third pin operable to output a modification of the signals.

5. The plug-in device of claim 1, wherein the attenuator circuit includes one or more resistive elements to provide the flat attenuation of the signals.

6. The plug-in device of claim 1, further comprising:
   a parallel RLC circuit electrically coupled to the attenuator circuit, the parallel RLC circuit operable to match the impedance of the series RLC circuit so as to balance the impedance of the plug-in device.

7. The plug-in device of claim 6, wherein the impedance of the plug-in device and the impedance of the electrical equipment are nominally 75 ohms.

8. A JXP-type device connectable to a transmission equipment to modify signals processed by the electrical equipment, the JXP-type device comprising:
   an attenuator circuit operating to provide a flat attenuation of the signals processed by the transmission equipment across the frequency range of the signals;
   a high-frequency compensation circuit electrically coupled to the attenuator circuit to set a frequency and bandwidth of a resonant peak of the JXP-type device and to compensate for the provided substantially flat signal response at the resonant frequency; and a balancing circuit electrically coupled to the attenuator circuit to balance the impedance posed by the high-frequency compensation circuit;

wherein, a nominal impedance of the JXP-type device is substantially the same as a nominal impedance of the electrical equipment, and the JXP-type device is detachable from the electrical equipment and interchangeable with other devices also of the JXP-type, wherein the attenuator circuit is a circuit having one of a bridged-T configuration, a T configuration, and a Pi configuration with resistive elements therein.

9. The JXP-type device of claim 8, wherein the balancing circuit comprises:

a resistive element, an inductive element, and a capacitive element electrically connected in parallel, to maintain a nominal impedance of the device over its operating frequency range.

10. The JXP-type device of claim 9, wherein the resistive element in the balancing circuit contributes to an overall resistance value of the attenuator circuit to direct the signal to the high-frequency compensation circuit at the resonant frequency.

11. The JXP-type device of claim 8, wherein the JXP-type device is interchangeable with an existing JXP attenuator for connection to the transmission equipment to deliver a predetermined amount of flat attenuation to balance a cable plant that includes the transmission equipment, while also providing signal peaking to correct for high frequency roll-off in the cable plant.

12. The JXP-type device of claim 8, wherein the high-frequency compensation circuit comprises:

a resistive element, an inductive element, and a capacitive element electrically connected in series.

13. The JXP-type device of claim 12, wherein a resistance value of the resistive element in the high-frequency compensation circuit is lower than an overall resistance value of the attenuator circuit to direct the signal to the high-frequency compensation circuit at the resonant frequency.

* * * * *